(12) United States Patent
Kim et al.

(10) Patent No.: US 6,567,366 B2
(45) Date of Patent: *May 20, 2003

(54) OPTICAL PICKUP USING LASER LIGHT OF DIFFERENT WAVELENGTHS TO RECORD AND REPRODUCE INFORMATION TO/FROM A DISK

(75) Inventors: Tae-Kyung Kim, Suwon (KR); Pyong-Yong Seong, Seoul (KR); Chul-Woo Lee, Seoul (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 87 days.

(21) Appl. No.: 09/144,639

(22) Filed: Aug. 31, 1998

(65) Prior Publication Data
US 2002/0012314 A1 Jan. 31, 2002

(30) Foreign Application Priority Data
Aug. 29, 1997 (KR) ............................................. 97-42828

(51) Int. Cl.$^7$ .................... G11B 7/00; G11B 7/135
(52) U.S. Cl. ......................... 369/112.21; 369/112.28
(58) Field of Search .................. 369/109, 109.1, 369/112, 112.28, 112.21, 112.18, 112.16, 112.17

(56) References Cited

U.S. PATENT DOCUMENTS

| | | | | |
|---|---|---|---|---|
| 4,399,529 A | * | 8/1983 | Leterme et al. | 369/110 |
| 5,477,386 A | * | 12/1995 | Okuda et al. | 369/112.21 X |
| 5,568,315 A | * | 10/1996 | Shuman | 359/487 |
| 5,657,306 A | * | 8/1997 | Komatsu | 369/109 OR |
| 6,038,089 A | * | 3/2000 | Maruyama et al. | 369/112 X |

FOREIGN PATENT DOCUMENTS

| | | |
|---|---|---|
| EP | 0 468 685 A2 | 7/1991 |
| JP | 60-205420 | 10/1985 |
| JP | 61-208003 | 9/1986 |
| JP | 64-49136 | 2/1989 |
| JP | 4-22913 | 1/1992 |
| JP | 7-130020 | 5/1995 |
| JP | 8-77581 | 3/1996 |
| JP | 9-80212 | 3/1997 |
| JP | 10-62611 | 3/1998 |
| JP | 10-268112 | 10/1998 |

* cited by examiner

Primary Examiner—Aristotelis M. Psitos
(74) Attorney, Agent, or Firm—Staas & Halsey LLP (57) ABSTRACT

An optical pickup records information on a recordable and reproducible disk and reads information therefrom. The optical pickup includes a laser light source for emitting first laser light in case of a reproduction mode for reproducing information from the disk and emitting second laser light in case of a recording mode for recording information on the disk. A collimating lens collimates the laser light emitted from the laser light source. A chromatic aberration corrector includes prisms of respectively different material properties, for beam-shaping and dispersing the laser light collimated by the collimating lens so that chromatic aberration of an optical spot formed on the disk is corrected in which the chromatic aberration is generated by a difference between the wavelengths of the first and second laser lights. The beam-shaped and dispersed first and second laser lights are focused on the disk by an objective lens.

23 Claims, 7 Drawing Sheets

OPTICAL PICKUP USING LASER LIGHT OF DIFFERENT WAVELENGTHS TO RECORD AND REPRODUCE INFORMATION TO/ FROM A DISK

CROSS REFERENCE TO RELATED APPLICATION

This application claims the benefit of Korean Patent Application No. 97-42828, filed Aug. 29, 1997, in the Korean Patent Office, the disclosure of which is incorporated herein by reference.

BACKGROUND OF THE INVENTION

1. Field of the Invention

The present invention relates to an optical pickup for a recordable and reproducible disk, and more particularly, to an optical pickup using laser light in which the wavelength of laser light which is used for reproducing information from a disk is different from that which is used for recording information on the disk.

2. Description of the Related Art

There have been proposed optical pickup technologies for freely recording and reproducing information on and from a disk, respectively, in order to heighten a utility of a recording medium such as an optical disk. In the case of a recordable and reproducible digital video disk (DVD) RAM whose specification is currently in progress, an optical pickup uses a laser light source which emits laser light having an output power of 30 mW and whose wavelength is approximately 650 nm. Since the laser light source emits the laser light to have a cross-section which is substantially elliptical, beam shaping is needed for the emitted laser light. The optical pickup also uses laser light of respectively different wavelengths for a reproduction mode for reproducing information from a recordable and reproducible disk and a recording mode for recording information on the optical disk, in order to obtain an optical power which is sufficient for recording information on the optical disk.

A conventional optical pickup performs beam shaping with respect to laser light of respectively different wavelengths which are used for a recording mode and reproduction mode.

Figure 1:
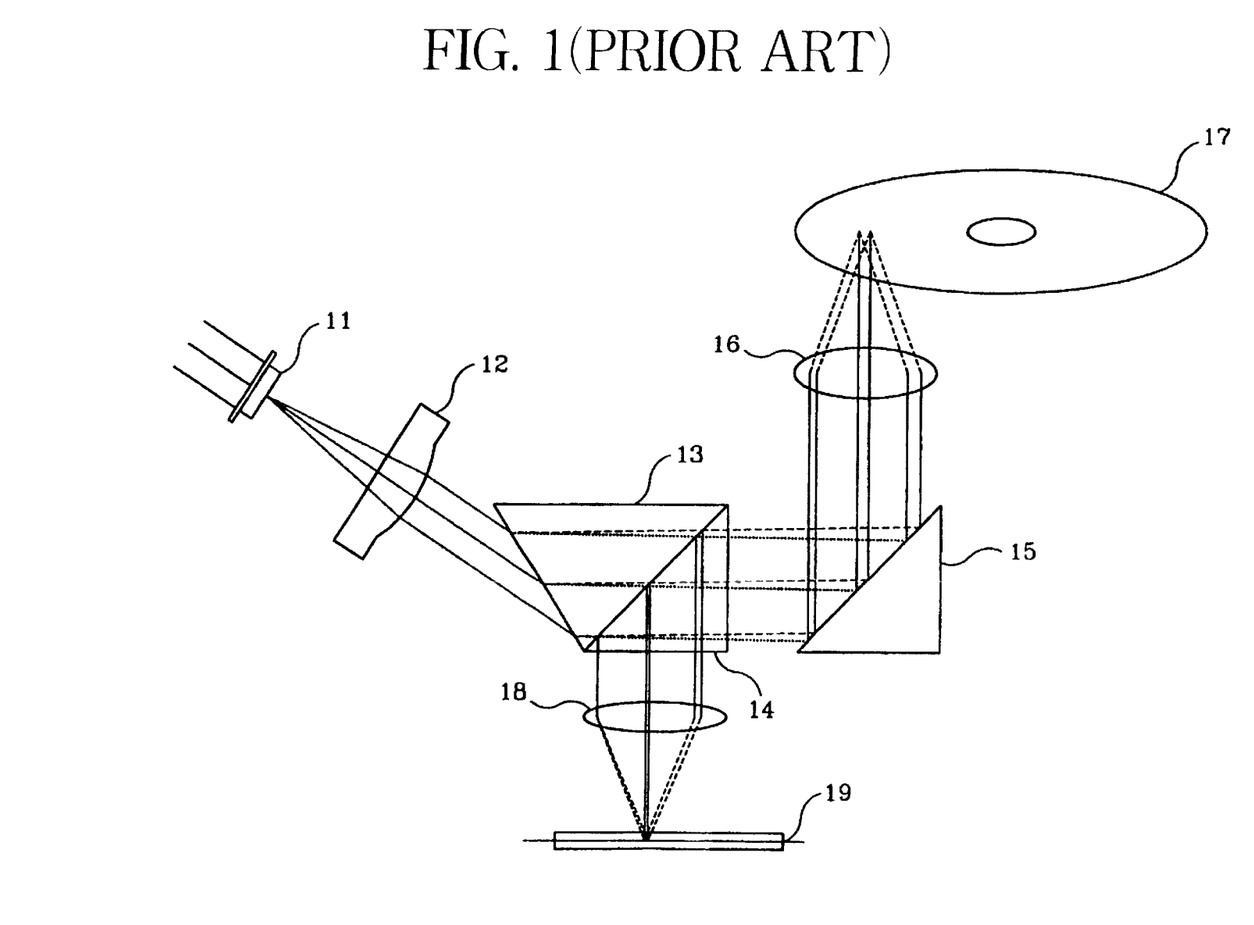
FIG. 1 shows a conventional optical pickup for a recordable and reproducible disk.

The optical pickup shown in FIG. 1 includes a laser diode 11 which emits laser light having a cross-section which is substantially elliptical. The laser diode 11 emits reproduction laser light having a wavelength of approximately 650 nm in case of a reproduction mode and emits recording laser light having a wavelength of approximately 652.5 nm in case of a recording mode. A collimating lens 12 collimates the reproduction laser light and the recording laser light emitted from the laser diode 11. The collimated laser light is incident to a beam shaping prism 13. The beam shaping prism 13 beam-shapes the laser light incident from the collimating lens 12 so that a short beam diameter is substantially the same as a long beam diameter. The direction toward which beam shaping is performed is the same as that of a short beam diameter. In FIG. 1, the beam shaping direction is parallel with the surface of the paper sheet. The laser light beam-shaped by the beam shaping prism 13 is incident to a beam splitter 14. The beam splitter 14 transfers the laser light incident from the beam shaping prism 13 to a reflection mirror 15. The reflection mirror 15 reflects the laser light incident from the beam splitter 14 at a right angle. The laser light reflected by the reflection mirror 15 is focused on a disk 17 by an objective lens 16.

The laser light reflected from the disk 17 is reflected again by the reflection mirror 15 and then incident to the beam splitter 14. The beam splitter 14 reflects the laser light incident from the reflection mirror 15 and the laser light reflected by the beam splitter 14 is focused by a focusing lens 18 on a photodiode 19.

In the case when the optical pickup shown in FIG. 1 having the above optical system is used, the position of an optical spot of the reproduction laser light on the disk 17 is not consistent with that of the recording laser light. For example, if the wavelength of the reproduction laser light differs from that of the recording laser light by about 2.5 nm, an optical spot due to the recording laser light is formed on a position shifted by about 0.2 $\mu$m from an optical spot due to the recording laser light along the direction toward which beam shaping is performed. The position movement of the optical spot is due to a chromatic aberration generated by the beam shaping in the optical system of the optical pickup. The chromatic aberration is generated by the beam shaping and variation of the wavelength by several nanometers when a reproduction mode is changed to a recording mode. The chromatic aberration changes within a short time so that an actuator cannot respond. Thus, the recording information is recorded in an undesired position on a disk along the size and direction of the chromatic aberration.

In a conventional optical pickup to solve the above problem, a laser diode is arranged to be slanted by a predetermined angle in the direction of the height of the optical pickup, that is, in the direction perpendicular to the surface of the disk, and a beam shaping prism performs beam shaping along the tangential direction of the disk. In the case of the conventional optical pickup, the optical spot formed on the disk does not shift in the radial direction of the disk although the wavelength has changed. However, even though the problem of the chromatic aberration can be solved by adjusting the arrangement of the laser diode, a new problem arises in that it is difficult to manufacture a compact optical pickup.

SUMMARY OF THE INVENTION

To solve the above problems, it is an object of the present invention to provide an optical pickup which can correct a chromatic aberration through dispersion in which the chromatic aberration has been generated by using laser light of respectively different wavelengths during recording and reproduction.

Additional objects and advantages of the invention will be set forth in part in the description which follows and, in part, will be obvious from the description, or may be learned by practice of the invention.

To accomplish the above objects and advantages of the present invention, there is provided an optical pickup for a recordable and reproducible disk, including a laser light source to emit first laser light in case of a reproduction mode for reproducing information from the disk and to emit second laser light in case of a recording mode for recording information on the disk; a collimating lens to collimate the laser light emitted from the laser light source; an objective lens to focus the incident laser light on the disk; and chromatic aberration correction means having optical elements of respectively different dispersion powers, for beam-shaping and dispersing the laser light collimated by the collimating lens through the optical elements so that the chromatic aberration of an optical spot formed on the disk is corrected in which the chromatic aberration is generated by a difference between the wavelengths of the first and second laser light, and to transmit the beam-shaped and dispersed laser light to the objective lens.

The chromatic aberration correction means includes a first triangular prism having a first surface to which the laser light collimated by the collimating lens is incident and a second surface from which the laser light incident to the first surface emerges; and a second triangular prism having a first surface contacting the second surface of the first triangular prism. The first and second triangular prisms have geometrical structures and material properties for performing beam shaping and lateral chromatic aberration correction with respect to the first and second laser light, respectively, a third surface of the first triangular prism facing the vertex of the first triangular prism contacts the vertex of the second triangular prism, and an angle formed by the first surface and the third surface of the first triangular prism is an obtuse angle. These prisms correct the chromatic aberration through beam shaping and dispersion.

BRIEF DESCRIPTION OF THE DRAWINGS

The above and other objects and advantages of the present invention will be apparent by describing the structure and operation thereof in detail with reference to the attached drawings in which.

DETAILED DESCRIPTION OF THE PREFERRED EMBODIMENTS

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

Preferred embodiments of the present invention will be described with reference to the accompanying drawings.

Since the elements in the embodiments to be described later having the same reference numerals as those of FIG. 1 perform the same optical functions as those of FIG. 1, the detailed description thereof will be omitted.

An optical pickup having an optical system shown in FIG. 2 according to a first embodiment of the present invention includes a laser diode 21, a chromatic aberration corrector including a triangular prism 23 (hereinafter referred to simply as a triangular prism), a right-angle prism 24, a beam splitter 25 having a polarized beam splitting function, and a quarter-wave plate 26, in addition to the configuration elements described with reference to FIG. 1.

The laser diode 21 emits linearly-polarized laser light whose cross-section is substantially elliptical. The present invention is not limited to specific wavelengths of the laser light. Thus, in this embodiment, it is assumed that the laser diode 21 emits first laser light appropriate for reading information from a disk 17 during a reproduction mode, and emits second laser light appropriate for recording information on the disk 17 during a recording mode.

Figure 7:
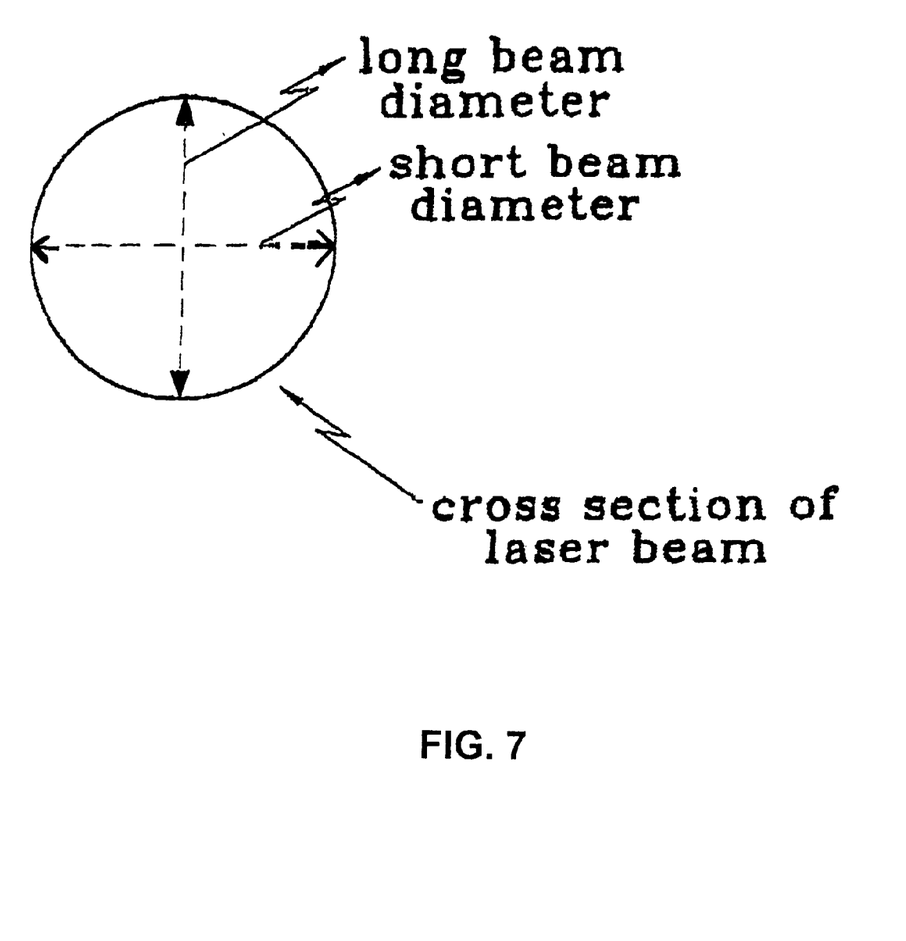
FIG. 7 is a cross-sectional view of the laser beam of FIG. 2 after passing through the triangular and right-angle prisms.

The laser light emitted from the laser diode 21 is collimated by a collimating lens 12 and then incident to the triangular prism 23. The triangular prism 23 and the right-angle prism 24 perform beam shaping and dispersion with respect to the laser light incident from the collimating lens 12. The triangular prism 23 and the right-angle prism 24 are arranged to perform beam shaping so that a short beam diameter is equal to a long beam diameter with respect to the laser light emitted from the laser diode 21. FIG. 7 illustrates that the long beam and short beam diameters are equal. The triangular prism 23 and the right-angle prism 24 also arranged along the direction perpendicular to the light (optical) axis of an objective lens 16.

The triangular prism 23 includes a surface 231 to which the laser light collimated by the collimating lens 12 is incident, a surface 233 through the laser light incident to the surface 231 emerges and a surface 235 facing a vertex of the triangular prism 23. The right-angle prism 24 is arranged so that a long-side surface 241 abuts the surface 233 of the triangular prism 23 with the beam splitter 25 interposed in between, and a surface 243 through which the laser light incident to the surface 241 emerges and the laser light emerged from the surface 243 are substantially perpendicular to each other. The triangular prism 23 has an angle of the vertex of $\alpha+45°$. In particular, the angle constituted by a normal line with respect to the surface 235 facing the vertex of the triangular prism 23 and the surface 233 is 45°. Most of the beam shaping of the laser light incident from the collimating lens 12 is performed through the surface 231 of the triangular prism 23. The triangular prism 23 beam-shapes and disperses the incident laser light. The laser light beam-shaped and dispersed by the triangular prism 23 is incident to the beam splitter 25. The beam splitter 25 is formed by a polarized beam split coating material coated on either one of the surfaces 233 and 241, and transmits the laser light incident from the triangular prism 23 toward the right-angle prism 24. The right-angle prism 24 beam-shapes and disperses the laser light incident through the beam splitter 25. Therefore, the chromatic aberration occurring due to the mutual difference between the wavelengths of the first laser light and the second laser light is corrected by the triangular prism 23 and the right-angle prism 24. The chromatic aberration through the beam shaping and the dispersion in the triangular prism 23 and the right-angle prism 24 will be described with reference to FIGS. 3A and 3B.

Figure 3A:
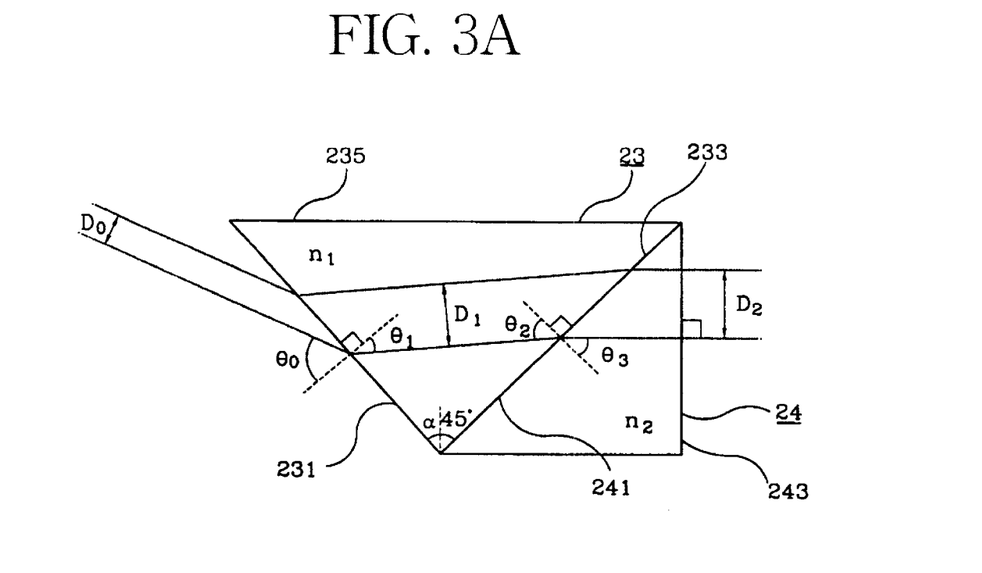
FIG. 3A is a view illustrating an optical path of laser light passing through prisms when the optical pickup shown in FIG. 2 operates in a reproduction mode.
Figure 3B:
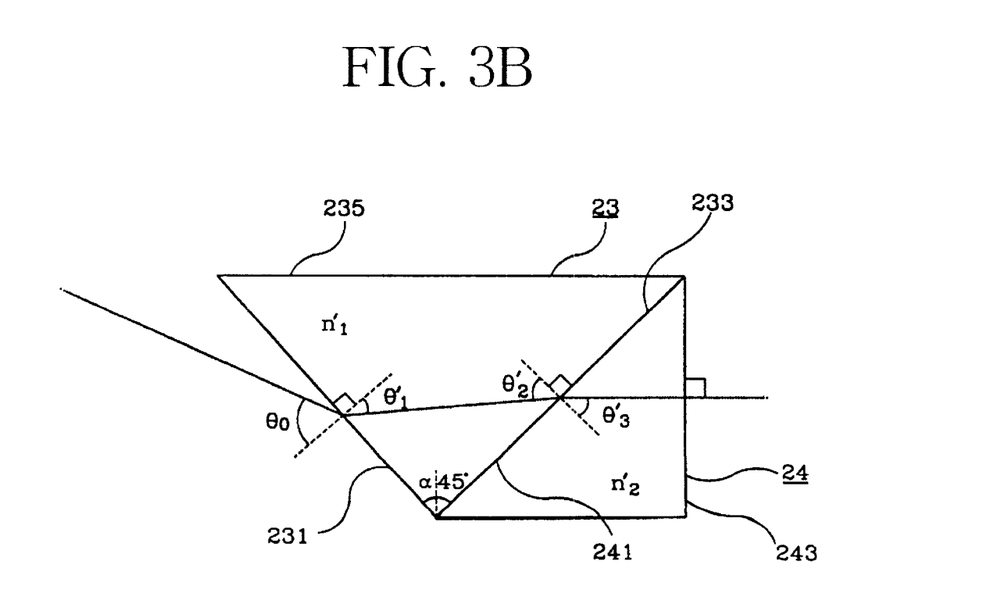
FIG. 3B is a view illustrating an optical path of laser light passing through the prisms when the optical pickup shown in FIG. 2 operates in a recording mode.

FIG. 3A illustrates an optical path of the first laser light passing through the triangular prism 23 and the right-angle prism 24 in a reproduction mode. FIG. 3B illustrates an optical path of the second laser light passing through the triangular prism 23 and the right-angle prism 24 in a recording mode. In FIGS. 3A and 3B, the beam splitter 25 is omitted for convenience of explanation.

Referring to FIG. 3A showing the optical path of the first laser light in a reproduction mode, the triangular prism 23 having the angle of vertex of α+45°, with respect to the first laser light incident from the collimating lens 12 to the surface 231 of the triangular prism 23 has a refractive index $n_1$ and the surface 231 of the triangular prism 23 has an angle of incidence $\theta_0$ and an angle of refraction $\theta_1$. The right-angle prism 24 has a refractive index $n_2$ and the surface 241 of the right-angle prism 24 has an angle of incidence $\theta_2$ and an angle of refraction $\theta_3$. By Snell's law, the surface 231 meets the following equation (1) and the surface 241 meets the following equation (2).

$$\sin \theta_0 = n_1 \sin \theta_1 \quad (1)$$

$$n_1 \sin \theta_2 = n_2 \sin \theta_3 \quad (2)$$

The prisms 23 and 24 have a beam shaping ratio ($D_2/D_0$) satisfying the following equation (3).

$$\frac{D_2}{D_0} = \frac{D_1}{D_0}\frac{D_2}{D_1} = \frac{\cos\theta_1}{\cos\theta_0}\frac{\cos\theta_3}{\cos\theta_2} \quad (3)$$

Here, $D_0$ is a short beam diameter possessed by the laser light incident to the surface 231. $D_1$ and $D_2$ represent the beam diameters altered from the beam diameter $D_0$ by the beam shaping of the triangular prism 23 and the right-angle prism 24, respectively.

Referring to FIG. 3B showing an optical path with respect to the second laser light generated by the increased optical output in the laser diode 21, the triangular prism 23 has a refractive index $n_1'$ and a refractive angle $\theta_1'$ with respect to the second laser light incident to the triangular prism 23 from the collimating lens 12 at the incident angle $\theta_0$ with respect to the surface 231. Also, the right-angle prism 24 has a refractive index $n_2'$ and the surface 241 has an incident angle $\theta_2'$ and a refractive angle $\theta_3'$. Therefore, in the case of the second laser light, the surface 231 satisfies the following equation (4) and the surface 241 satisfies the following equation (5), respectively.

$$\sin \theta_0 = n_1' \quad (4)$$

$$n_1' \sin \theta_2 = n_2' \sin \theta_3' \quad (5)$$

Thus, when the dispersions of the triangular prism 23 and the right-angle prism 24 are appropriately selected, a condition for correcting a chromatic aberration, that is, $\theta_3 = \theta_3'$ can be met. If $n_1' = n_1 + \Delta n_1$ and $n_2' = n_2 + \Delta n_2$ with respect to the variation $\Delta n'$ of the refractive index in accordance with the change of wavelength of the laser light, and the angle of vertex α+45° of the triangular prism 23 is defined as β, the chromatic aberration generated by the change of wavelength is corrected by the triangular prism 23 and the right-angle prism 24 satisfying the following equation (6), in the case when the surfaces 231 and 241 are slanted in the form of rotating in the opposite directions to each other based on the direction parallel with the surface 243 of the right-angle prism 24.

$$\sin\theta_1 = \sin\beta\sqrt{(n_1 + \Delta n_1)^2 - \frac{(n_2 + \Delta n_2)^2}{2}} - \cos\beta\frac{n_2 + \Delta n_2}{\sqrt{2}} \quad (6)$$

The laser light beam-shaped and dispersed by the triangular prism 23 and the right-angle prism 24 is circularly-polarized by the quarter-wave plate 26, and then incident to the reflection mirror 15. The reflection mirror 15 reflects the incident laser light so that the laser light incident from the quarter-wave plate 26 proceeds toward the objective lens 16. The objective lens 16 focuses the laser light incident from the reflection mirror 15 on the reproducible/recordable disk 17. The optical spot focused on the disk 17 is made by the results that the lateral chromatic aberration has been corrected by the triangular prism 23 and the right-angle prism 24. Although the change of wavelength in the laser light occurs, the optical spot is formed in substantially the same position on the disk 17.

The laser light reflected from the disk 17 and having passed through the objective lens 16 is reflected from the reflection mirror 15 to then proceed toward the quarter-wave plate 26. The quarter-wave plate 26 changes the polarized state of the laser light incident from the reflection mirror 15 from circularly-polarized light to linear-polarized light. The linearly polarized laser light is incident to the right-angle prism 24. The beam splitter 25 reflects the laser light incident via the right-angle prism 24 from the quarter-wave plate 26. The reflected laser light is focused on the photodiode 19 by the focusing lens 18.

According to the experimental results, when using a laser light source emitting the laser light having an output of 30 mW and whose wavelength is 650 nm for a DVD-RAM, the angle formed between the laser light incident to the surface 231 of the triangular prism 23 and the direction parallel with the surface 235 is 24.856°. Under the condition that the angle of vertex is 86° in the triangular prism 23, the optical pickup shown in FIG. 2 shifts the optical spot by about 0.0025 μm on the disk 17, with respect to the variation of 2.5 nm in wavelength.

Figure 4:
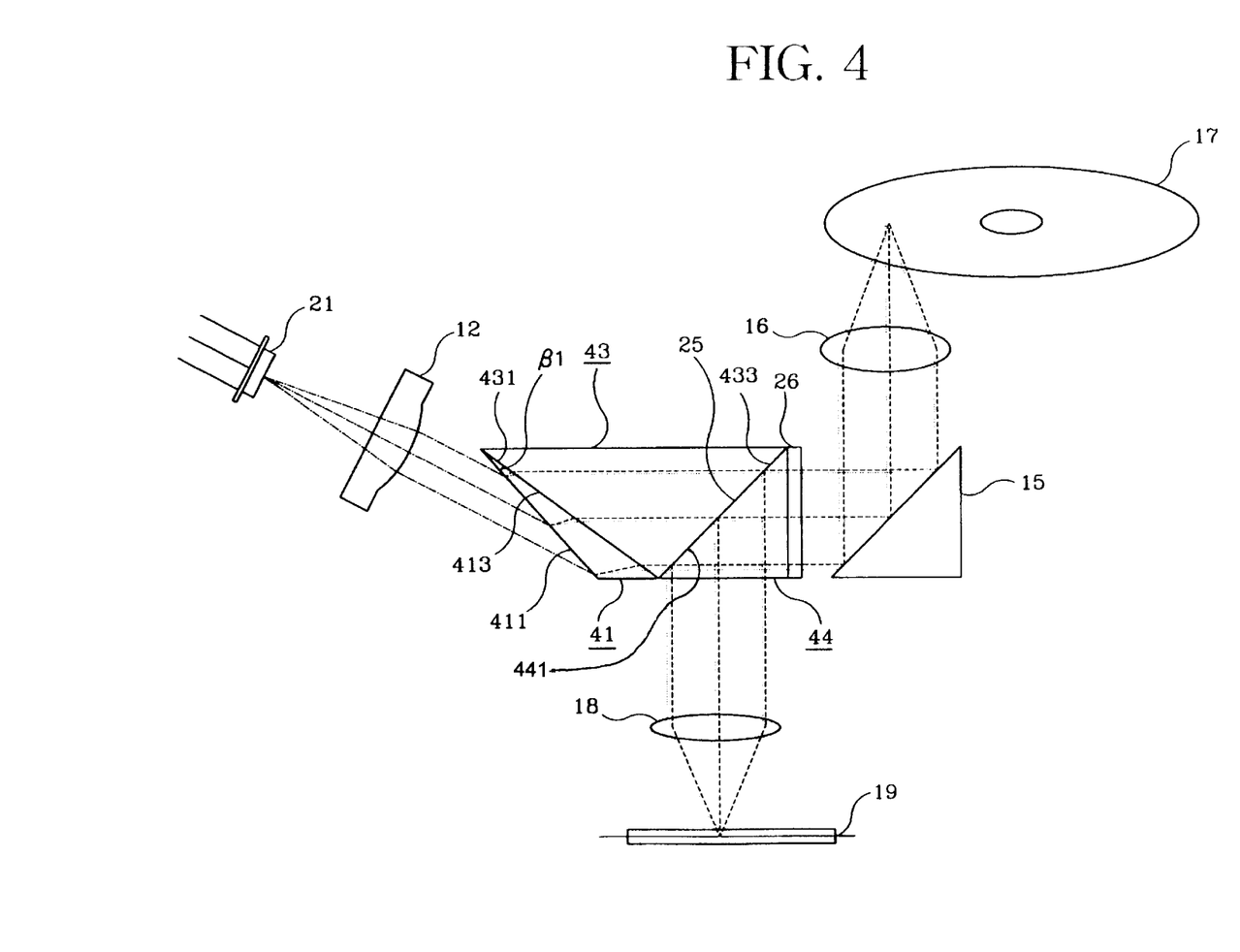
FIG. 4 shows an optical system of an optical pickup for a recordable and reproducible disk according to a second embodiment of the present invention.

FIG. 4 shows an optical system of an optical pickup according to a second embodiment of the present invention. The optical system shown in FIG. 4 has a great capability of chromatic aberration correction and is advantageous to miniaturize the optical pickup, as compared with the optical system shown in FIG. 2.

Figure 2:
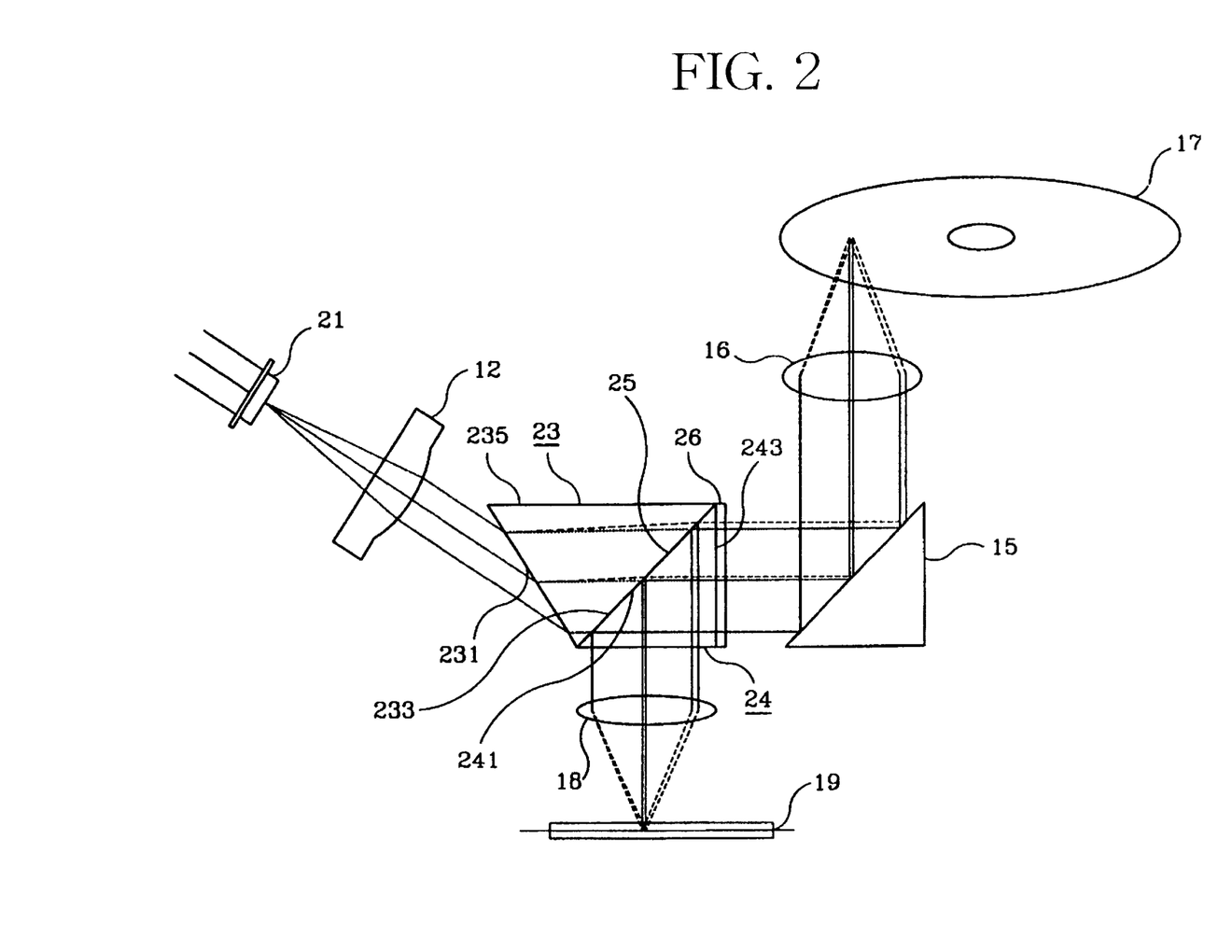
FIG. 2 shows an optical system of an optical pickup for a recordable and reproducible disk according to a first embodiment of the present invention.

An optical pickup according to the second embodiment of the present invention shown in FIG. 4 includes a separate prism 41 for correcting a chromatic aberration in place of the triangular prism 23 shown in FIG. 2, and a triangular prism 43 and a right-angle prism 44 which are made of the same material to have the same refractive index. The prisms 41, 43 and 44 are arranged to perform beam shaping through which a short beam diameter is the same as a long beam diameter, with respect to first and second laser light emitted from the laser diode 21. The prisms 41, 43, and 44 are also arranged in parallel with each other along the direction perpendicular to the optical axis of the objective lens 16. The prism 41 includes a surface 411 to which the laser light emerged from the collimating lens 12 is incident and a surface 413 through which the incident laser light emerges. The triangular prism 43 includes a surface 431 contacting the surface 413 of the prism 41, and a surface 433 through which the laser light incident to the surface 431 emerges. The angle of vertex in the triangular prism 43 made by the surfaces 431 and 433 has the range of an obtuse angle. The right-angle prism 44 is arranged in such a manner that a long-side 441 thereof contacts the triangular prism 43, with the beam splitter 25 interposed in between. The beam splitter 25 is formed by a polarized beam split coating material coated on either one of the surfaces 433 of the triangular prism 43 and 441 of the right-angle prism 44.

In the optical pickup of FIG. 4, since the elements except for the prisms 41, 43 and 44 have the same optical features and arrangement as those of the optical pickup shown in FIG. 2, the detailed description thereof will be omitted.

The prism 41 beam-shapes and disperses the laser light incident from the collimating lens 12. Most of the beam shaping with respect to the laser light incident is performed through the surface 411 of the prism 41. The laser light emerged from the prism 41 is beam-shaped and dispersed again by the triangular prism 43. When the surfaces 411 and 431 are slanted in the form of rotating in the same direction based on the direction parallel with the surface 441 of the right-angle prism 44, for example, in the case that the angle formed by the surface facing the vertex of the prism 41 and the surface 411 is obtuse, the prism 41 and the triangular prism 43 have the material properties which satisfy the following equation (7). Thus, the chromatic aberration occurring according to the variation of wavelength of the laser light is corrected.

$$\sin\theta_1 = -\sin\beta_1 \sqrt{(n_3 + \Delta n_3)^2 - \frac{(n_4 + \Delta n_4)^2}{2}} + \cos\beta_1 \frac{n_4 + \Delta n_4}{\sqrt{2}} \quad (7)$$

Figure 5A:
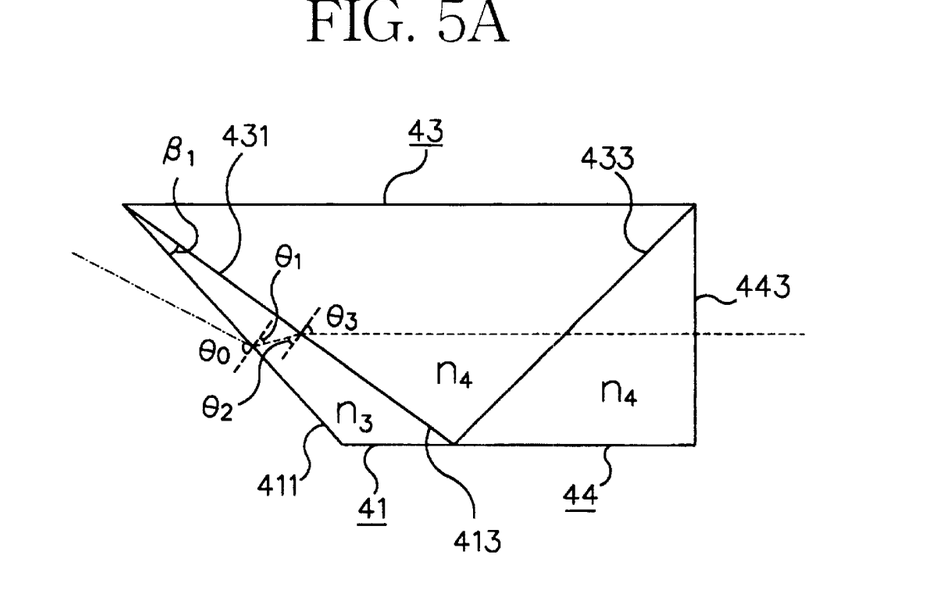
FIG. 5A is a view illustrating an optical path of the laser light passing through prisms when the optical pickup shown in FIG. 4 operates in a reproduction mode.
Figure 5B:
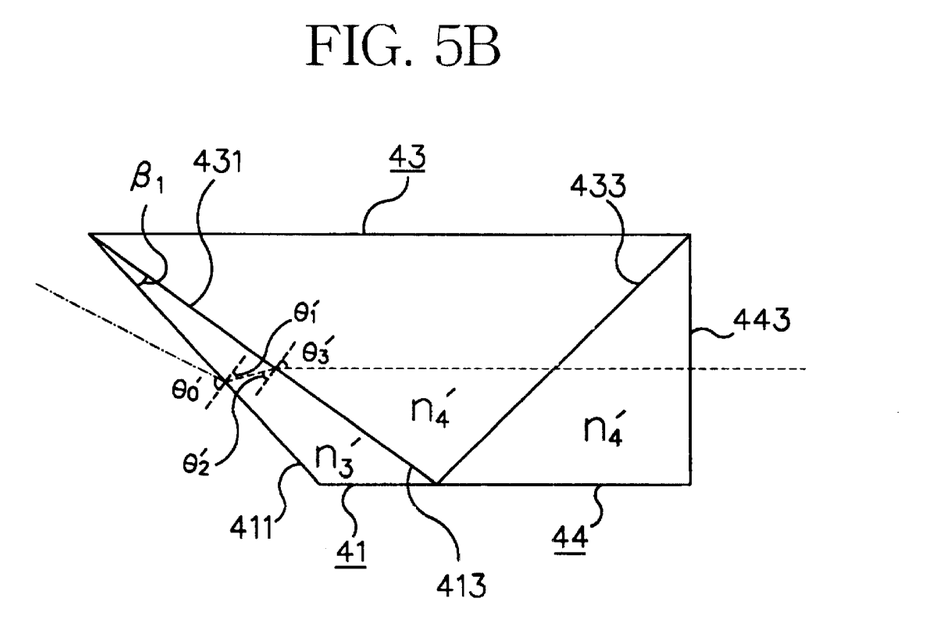
FIG. 5B is a view illustrating an optical path of the laser light passing through prisms when the optical pickup shown in FIG. 4 operates in a recording mode.

Here, $\beta_1$ is the vertex of the prism 41, $n_3$ is the refractive index of the prism 41 with respect to the first laser light, $n_3'(=n_3+\Delta n_3)$ is the refractive index of the prism 41 with respect to the second laser light, $n_4$ is the refractive index of the triangular prism 43 with respect to the first laser light, and $n_4'(=n_4+\Delta n_4)$ is the refractive index of the triangular prism 43 with respect to the second laser light. The right-angle prism 44 is fabricated using the same material as that of the triangular prism 43 and has the same refractive index. When the optical pickup shown in FIG. 4 operates in a reproduction mode, the prisms 41, 43 and 44 form the optical path shown in FIG. 5A, while they form the optical path shown in FIG. 5B when the optical pickup shown in FIG. 4 operates in a recording mode.

According to experimental results, when using a laser light source emitting the laser light having an output of 30 mW and whose wavelength is 650 nm for a DVD-RAM, the angle formed by the laser light incident to the surface 411 of the triangular prism 41 and the surface 411 is 27.618°. Under the condition that the angle of vertex is 98.965° in the triangular prism 43, the optical pickup shown in FIG. 4 shifts the optical spot by about 0.0025 µm on the disk 17, with respect to the variation of 2.5 nm in wavelength.

Figure 6:
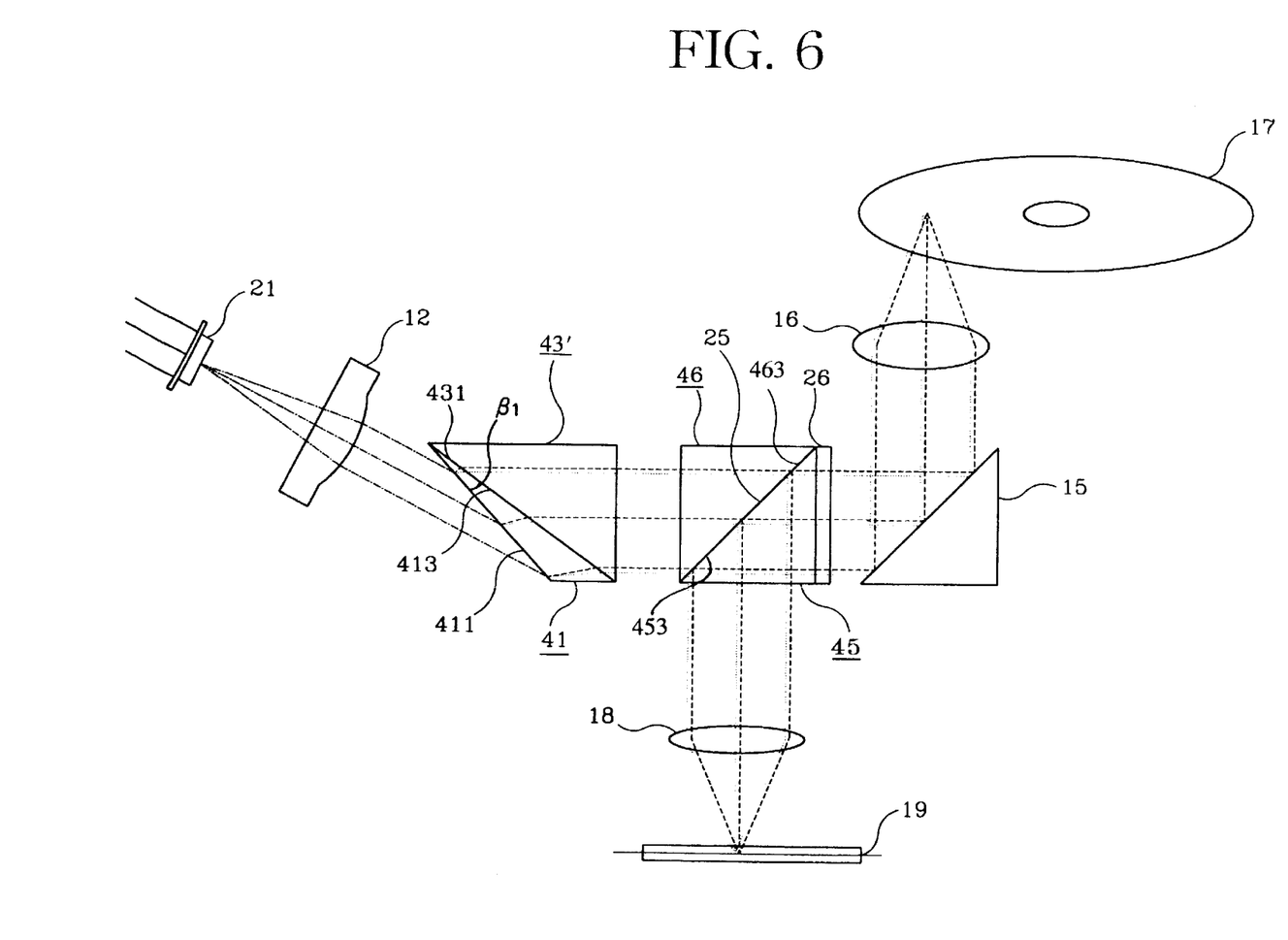
FIG. 6 shows an optical system of an optical pickup for a recordable and reproducible disk according to a third embodiment of the present invention.

FIG. 6 shows an optical system of an optical pickup according to a third embodiment of the present invention. The optical pickup shown in FIG. 6 includes two right-angle prisms 45 and 46 in place of the triangular prism 44 shown in FIG. 4. A right-angle prism 43' performs the same optical function as that of the triangular prism 43 shown in FIG. 4 with respect to the laser light incident from the prism 41. A long-side surface of the right-angle prism 43' contacts the prism 41 and the right-angle prism 46 contacts the right-angle prism 45, with the beam splitter 25 interposed in between. The right-angle prisms 45 and 46 contact each other in the fashion that the long-side surfaces 453 and 463 face each other. The beam splitter 25 is formed by a polarized beam split coating material coated on the surface in which the triangular prisms 45 and 46 contact each other, as in the case of the optical pickup shown in FIG. 4. Except for the constructional difference, the FIG. 6 optical pickup performs the same optical arrangement and function as that of the optical pickup shown in FIG. 4. Since the optical pickup shown in FIG. 6 uses the right-angle prisms 45 and 46 of the same shape, the fabrication thereof is facilitated.

As described above, the optical pickup according to the present invention can correct the chromatic aberration occurring due to the variation of wavelengths of the laser lights used for reading information from a recordable/reproducible disk and recording information on the disk. In addition, by accomplishing correction of the chromatic aberration, it is possible to provide a radial beam shaping advantageous for making the optical pickup compact. The prisms used in the conventional optical pickup can be replaced by the prisms for shaping beams and correcting chromatic aberration according to the present invention. Thus, although an optical system similar in some respects to the conventional optical system of the optical pickup is used, the chromatic aberration occurring according to the variation of wavelength of the laser light can be corrected.

While only certain embodiments of the invention have been specifically described herein, it will be apparent that numerous modifications may be made thereto without departing from the spirit and scope of the invention.

What is claimed is:

1. An optical pickup for a recordable and reproducible optical disk, comprising:

a laser light source to emit first laser light in a reproduction mode to reproduce information from the optical disk and to emit second laser light in a recording mode to record information on the optical disk;

a collimating lens to collimate the first and second laser lights emitted from the laser light source;

chromatic aberration correction means having optical elements of respectively different dispersion powers, to beam-shape and disperse the first and second laser lights collimated by the collimating lens through the optical elements so that a chromatic aberration of an optical spot formed on the optical disk is corrected in which the chromatic aberration is generated by a difference between wavelengths of the first and second laser lights, said chromatic aberration correction means comprising
a first triangular prism including a vertex, a first surface to which the first and second laser lights collimated by the collimating lens are incident, a second surface from which the first and second laser lights incident to the first surface emerge, and a third surface facing the vertex, and
a second triangular prism including a vertex, and a first surface contacting the second surface of the first triangular prism, wherein the first and second triangular prisms have geometrical structures and material properties to perform the beam-shaping and lateral chromatic aberration correction with respect to the first and second laser lights, respectively, and the third surface of the first triangular prism facing the vertex of the first triangular prism contacts the vertex of the second triangular prism, and an angle formed by the first surface and the third surface of the first triangular prism is an obtuse angle, the first and second triangular prisms satisfying $$\sin\theta_1 = -\sin\beta_1 \sqrt{(n_3 + \Delta n_3)^2 - \frac{(n_4 + \Delta n_4)^2}{2}} + \cos\beta_1 \frac{n_4 + \Delta n_4}{\sqrt{2}}$$

in which $\theta_1$ is a refractive index of the first and second laser lights incident to the first surface of the first triangular prism, $\beta_1$ is an angle of the vertex of the first triangular prism, $n_3$ is a refractive index of the first triangular prism with respect to the first laser light, $n_4$ is a refractive index of the second triangular prism with respect to the first laser light, $n_3+\Delta n_3$ is a refractive index of the first triangular prism with respect to the second laser light, and $n_4+\Delta n_4$ is a refractive index of the second triangular prism with respect to the second laser light;

an objective lens to focus the beam-shaped and dispersed first and second laser lights transmitted by the chromatic aberration correction means on the optical disk;

third and fourth triangular prisms, connected on respective long-side surfaces to each other; and a beam splitter being in an optical path of the first and second laser lights between the second triangular prism and the objective lens and formed on the long side surfaces of the third and fourth triangular prisms.

2. The optical pickup according to claim 1, wherein said laser light source emits the first and second laser lights each having a cross-section which is substantially elliptical.

3. The optical pickup according to claim 2, wherein said first and second triangular prisms beam-shape the first and second laser lights incident from the collimating lens so that a short beam diameter is substantially the same as a long beam diameter, and correct the lateral chromatic aberration occurring along a direction of the short beam diameter of the first and second laser lights incident from the collimating lens.

4. The optical pickup according to claim 3, wherein the second triangular prism includes a second surface facing the vertex of the second triangular prism and the first and second triangular prisms are arranged so that the first and second laser lights transmitting through the second triangular prism travel substantially in parallel with the second surface of the second triangular prism.

5. The optical pickup according to claim 4, wherein said first and second triangular prisms have the material properties which satisfy the following equation when the first surface of the first triangular prism and the first surface of the second triangular prism are slanted in a form of rotating in the same direction based on a direction parallel with a normal line with respect to the second surface of the second triangular prism, $$\sin\theta_1 = \sin\beta \sqrt{(n_1+\Delta n_1)^2 - \frac{(n_2+\Delta n_2)^2}{2}} - \cos\beta\frac{n_2+\Delta n_2}{\sqrt{2}}$$

in which $\theta_1$ is an angle of refraction of the first laser light incident to the first surface of the first triangular prism, $\beta$ is an angle of the vertex of the first triangular prism, $n_1$ is a refractive index of the first triangular prism with respect to the first laser light, $n_2$ is a refractive index of the second triangular prism with respect to the first laser light, $n_1+\Delta n_1$ is a refractive index of the first triangular prism with respect to the second laser light, and $n_2+\Delta n_2$ is a refractive index of the second triangular prism with respect to the second laser light.

6. The optical pickup according to claim 4, wherein the second triangular prism includes a third surface, the optical pickup further comprising:

a photodetector;

a focusing lens; and a quarter-wave plate positioned on an optical path between the fourth triangular prism and the objective lens;

wherein the beam splitter transmits the first and second laser lights incident from the second triangular prism to the quarter-wave plate, and reflects the first and second laser lights reflected from the optical disk and transmitted by the objective lens, quarter-wave plate and fourth triangular prism toward the focusing lens, wherein the focusing lens focuses the incident first and second laser lights on the photodetector, and wherein an angle formed between a normal line with respect to the second surface of the second triangular prism facing the vertex of the second triangular prism and the third surface of the second triangular prism from which the first and second laser lights incident to the first surface of the second triangular prism emerges, is 45°.

7. The optical pickup according to claim 6, wherein the beam splitter comprises a polarized beam split coating material coated on one of the long-side surface of the third triangular prism and the long-side surface of the fourth triangular prism.

8. The optical pickup according to claim 6, wherein said first, second, third and fourth triangular prisms are arranged along a direction perpendicular to an optical axis of the objective lens, and the optical pickup further comprises a reflection mirror to transmit the first and second laser lights emerged from the right-angle quarter-wave plate toward the objective lens and transmits the reflected first and second laser lights emerged from the objective lens to the quarter-wave plate.

9. The optical pickup according to claim 4, wherein the second triangular prism is a right-angle triangular prism in which an angle formed between the third surface of the second triangular prism from which the first and second laser lights incident to the first surface emerge and the first surface of the second triangular prism is 45°, and the optical pickup comprises:

a photodetector;

a focusing lens; and a quarter-wave plate positioned on an optical path between the second triangular prism and the objective lens, wherein the beam splitter transmits the first and second laser lights incident from the second triangular prism source to the quarter-wave plate, and reflects the first and second laser lights reflected from the optical disk and transmitted by the objective lens and the quarter-wave plate toward the focusing lens, and wherein the focusing lens focuses the first and second laser lights incident from the beam splitter on the photodetector.

10. The optical pickup according to claim 9, wherein said third and fourth triangular prisms are right angle prisms, and the beam splitter further comprises a polarized beam split coating material coated on at least one of the long-side surfaces where the third and fourth triangular prisms contact each other.

11. The optical pickup according to claim 9, wherein the first and second triangular prisms and the beam splitter are arranged along a direction perpendicular to an optical axis of the objective lens, and the optical pickup further comprises a reflection mirror to transmit the first and second laser lights emerged from the quarter-wave plate toward the objective lens, and to transmit the reflected first and second laser lights emerged from the objective lens to the quarter-wave plate.

12. The optical pickup according to claim 1, wherein said third and fourth triangular prisms are right-angle prisms.

13. The optical pickup according to claim 1, further comprising polarized beam split coating material coated on at least one of long-side surfaces of the third and fourth triangular prisms, the polarized beam split coating material passing the first and second laser lights incident from the third triangular prism to the fourth triangular prism.

14. The optical pickup according to claim 13, further comprising a photodetector, wherein the polarized beam split coating material reflects the first and second laser lights after being reflected from the optical disk and incident from the fourth triangular prism toward the photodetector.

15. An optical pickup for a recordable and reproducible optical disk, comprising:
    a laser light source to emit first laser light having a first frequency in a reproduction mode to reproduce information from the optical disk, and to emit second laser light having a second frequency different from the first frequency in a recording mode to record the information on the optical disk;
    a collimator to collimate the first and second laser lights;
    a chromatic aberrator having a first optical element and a second optical element of respectively different dispersion powers, to beam-shape and disperse the collimated first and second laser lights, to correct a chromatic aberration generated by a difference between the first and second wavelengths of optical spots formed on the optical disk;
    an objective lens to focus the beam-shaped and dispersed first and second laser lights as the optical spots on the optical disk; and
    third and fourth optical elements, connected on respective long-side surfaces to each other, the third and fourth optical elements being in an optical path of the first and second laser lights between the second optical element and the objective lens,
    wherein said first optical element comprises a vertex, a first surface to which the collimated first and second laser lights are incident, and a second surface from which the first and second laser lights incident to the first surface emerge, and a third surface facing the vertex, and the first and second optical elements satisfying $$\sin\theta_1 = -\sin\beta_1 \sqrt{(n_3 + \Delta n_3)^2 - \frac{(n_4 + \Delta n_4)^2}{2}} + \cos\beta_1 \frac{n_4 + \Delta n_4}{\sqrt{2}}$$

in which $\theta_1$ is a refractive index of the first and second laser lights incident to the first surface of the first optical element, $\beta_1$ is an angle of the vertex of the first optical element, $n_3$ is a refractive index of the first optical element with respect to the first laser light, $n_4$ is a refractive index of the second optical element with respect to the first laser light, $n_3+\Delta n_3$ is a refractive index of the first optical element with respect to the second laser light, and $n_4 +\Delta n_4$ is a refractive index of the second optical element with respect to the second laser light.

16. The optical pickup as claimed in claim 15, wherein the first and second optical elements have different refractive indexes.

17. The optical pickup as claimed in claim 16, wherein:
    the second optical element is a right-angle prism and comprises
        a second vertex,
        a first surface contacting the second surface of the first optical element, and
        a second surface from which the first and second laser lights incident to the first surface of the second optical element emerge.

18. The optical pickup as claimed in claim 17 wherein said third optical element and said fourth optical element are right-angle prisms.

19. The optical pickup as claimed in claim 18, further comprising:
    a photodetector; and
    a polarized beam split coating material coated on at least one of the long-side surfaces of the third and fourth optical elements, the polarized beam split coating material passing the first and second laser lights incident from the third optical element to the fourth optical element and reflecting the first and second laser lights reflected from the optical disk and incident from the fourth optical element toward the photodetector.

20. An optical pickup for a recordable and reproducible optical disk, comprising:
    a laser light source to emit first laser light having a first frequency in a reproduction mode to reproduce information from the optical disk, and to emit second laser light having a second frequency different from the first frequency in a recording mode to record the information on the optical disk;
    a collimator to collimate the first and second laser lights;
    a chromatic aberrator having a first optical element and a second optical element of respectively different dispersion powers, to beam-shape and disperse the collimated first and second laser lights, to correct a chromatic aberration generated by a difference between the first and second wavelengths of optical spots formed on the optical disk;
    an objective lens to focus the beam-shaped and dispersed first and second laser lights as the optical spots on the optical disk; and
    third and fourth optical elements, connected on respective long-side surfaces to each other, the third and fourth optical elements being in an optical path of the first and second laser lights between the second optical element a rd the objective lens,
    wherein said first optical element comprises a vertex, a first surface to which the collimated first and second laser lights are incident, and a second surface from which the first and second laser lights incident to the first surface emerge, and a third surface facing the vertex,
    the second optical element is a right-angle prism and comprises
        a second vertex,
        a first surface contacting the second surface of the first optical element, and
        a second surface from which the first and second laser lights incident to the first surface of the second optical elements emerge;
    the first and second optical elements satisfying the following equation $$\sin\theta_1 = \sin\beta \sqrt{(n_1 + \Delta n_1)^2 - \frac{(n_2 + \Delta n_2)^2}{2}} - \cos\beta \frac{n_2 + \Delta n_2}{\sqrt{2}}$$

in which $\theta_1$ is a refractive index of the first and second laser lights incident to the first surface of the first optical element, $\beta$ is an angle of the vertex of the first optical element, $n_1$ is a refractive index of the first optical element with respect to the first laser light, $n_2$ is a refractive index of the second optical element with respect to the first laser light, $n_1+\Delta n_1$ is a refractive index of the first optical element with respect to the second laser light, and $n_2 +\Delta n_2$ is a refractive index of the second optical element with respect to the second laser light.

21. The optical pickup as claimed in claim 20, further comprising:

a photodetector; and a polarized beam split coating material coated on at least one of the second surface of the first optical element and the first surface of the second optical element, the polarized beam split coating material passing the first and second laser lights incident from the first optical element to the second optical element and reflecting the first and second laser lights reflected from the optical disk and incident from the second optical element toward the photodetector.

22. An optical pickup for an optical disk comprising:

a laser light source to emit first laser light having a first frequency in a reproduction mode to reproduce information from the optical disk, and to emit second laser light having a second frequency different from the first frequency in a recording mode to record the information on the optical disk;

a collimator to collimate the first and second laser lights;

a chromatic aberrator having a first optical element and a second optical element of respectively different dispersion powers, the first and second optical elements are first and second triangular prisms, respectively, having different refractive indexes, to beam-shape and disperse the collimated first and second laser lights, to correct a chromatic aberration generated by a difference between the first and second wavelengths of optical spots formed on the optical disk;

an objective lens to focus the beam-shaped and dispersed first and second laser lights as the optical spots on the optical disk;

third and fourth triangular prisms each of which is a right-angle prism, connected on respective long-side surfaces to each other, the third and fourth triangular prisms being in an optical path of the first and second laser lights between the second triangular prism and the objective lens;

a photodetector; and a polarized beam split coating material coated on at least one of long-sides of the third and fourth triangular prisms, the polarized beam split coating material passing the first and second laser lights incident from the third triangular prism to the fourth triangular prism and reflecting the first and second laser lights reflected from the optical disk and incident from the fourth triangular prism toward the photodetectors, wherein the first triangular prism comprises a vertex, a first surface to which the collimated first and second laser lights are incident, and a second surface from which the first and second laser lights incident to the first surface emerge, and a third surface facing the vertex, the second triangular prism is a right-angle prism and comprises a second vertex, a first surface contacting the second surface of the first triangular prism, and a second surface from which the first and second laser lights incident to the first surface of the second triangular prism emerge, the first and second triangular prisms satisfying the following equation $$\sin\theta_1 = -\sin\beta_1 \sqrt{(n_3 + \Delta n_3)^2 - \frac{(n_4 + \Delta n_4)^2}{2}} + \cos\beta_1 \frac{n_4 + \Delta n_4}{\sqrt{2}}$$

in which $\theta_1$ is a refractive index of the first and second laser lights incident to the first surface of the first triangular prism, $\beta_1$ is an angle of the vertex of the first triangular prism, $n_3$ is a refractive index of the first triangular prism with respect to the first laser light, $n_4$ is a refractive index of the second triangular prism with respect to the first laser light, $n_3+\Delta n_3$ is a refractive index of the first triangular prism with respect to the second laser light, and $n_4+\Delta n_4$ is a refractive index of the second triangular prism with respect to the second laser light.

23. An optical pickup for a recordable and reproducible optical disk, comprising:

a laser light source to emit a first laser light and to emit a second laser light; and chromatic aberration correction means comprising a first triangular prism including a vertex, a first surface to which the first and second laser lights are incident, a second surface from which the first and second laser lights incident to the first surface emerge, and a third surface facing the vertex, and a second triangular prism contacting the first triangular prism, the first and second triangular prisms satisfying $$\sin\theta_1 = -\sin\beta_1 \sqrt{(n_3 + \Delta n_3)^2 - \frac{(n_4 + \Delta n_4)^2}{2}} + \cos\beta_1 \frac{n_4 + \Delta n_4}{\sqrt{2}}$$

in which $\theta_1$ is a refractive index of the first and second laser lights incident to the first surface of the first triangular prism, $\beta_1$ is an angle of the vertex of the first triangular prism, $n_3$ is a refractive index of the first triangular prism with respect to the first laser light, $n_4$ is a refractive index of the second triangular prism with respect to the first laser light, $n_3 +\Delta n_3$ is a refractive index of the first triangular prism with respect to the second laser light, and $n_4+\Delta n_4$ is a refractive index of the second triangular prism with respect to the second laser light.

* * * * *

UNITED STATES PATENT AND TRADEMARK OFFICE
CERTIFICATE OF CORRECTION

PATENT NO. : 6,567,366 B2
DATED : May 20, 2003
INVENTOR(S) : Tae-Kyung Kim et al.

It is certified that error appears in the above-identified patent and that said Letters Patent is hereby corrected as shown below:

<u>Column 13,</u>
Line 57, change "photodectors," to -- photodetector, --

Signed and Sealed this

Twenty-third Day of March, 2004

JON W. DUDAS
*Acting Director of the United States Patent and Trademark Office*